Oct. 25, 1966  W. B. ELAM  3,280,709
CONTAINER AND MANUFACTURE THEREOF
Filed Dec. 30, 1963  3 Sheets-Sheet 1
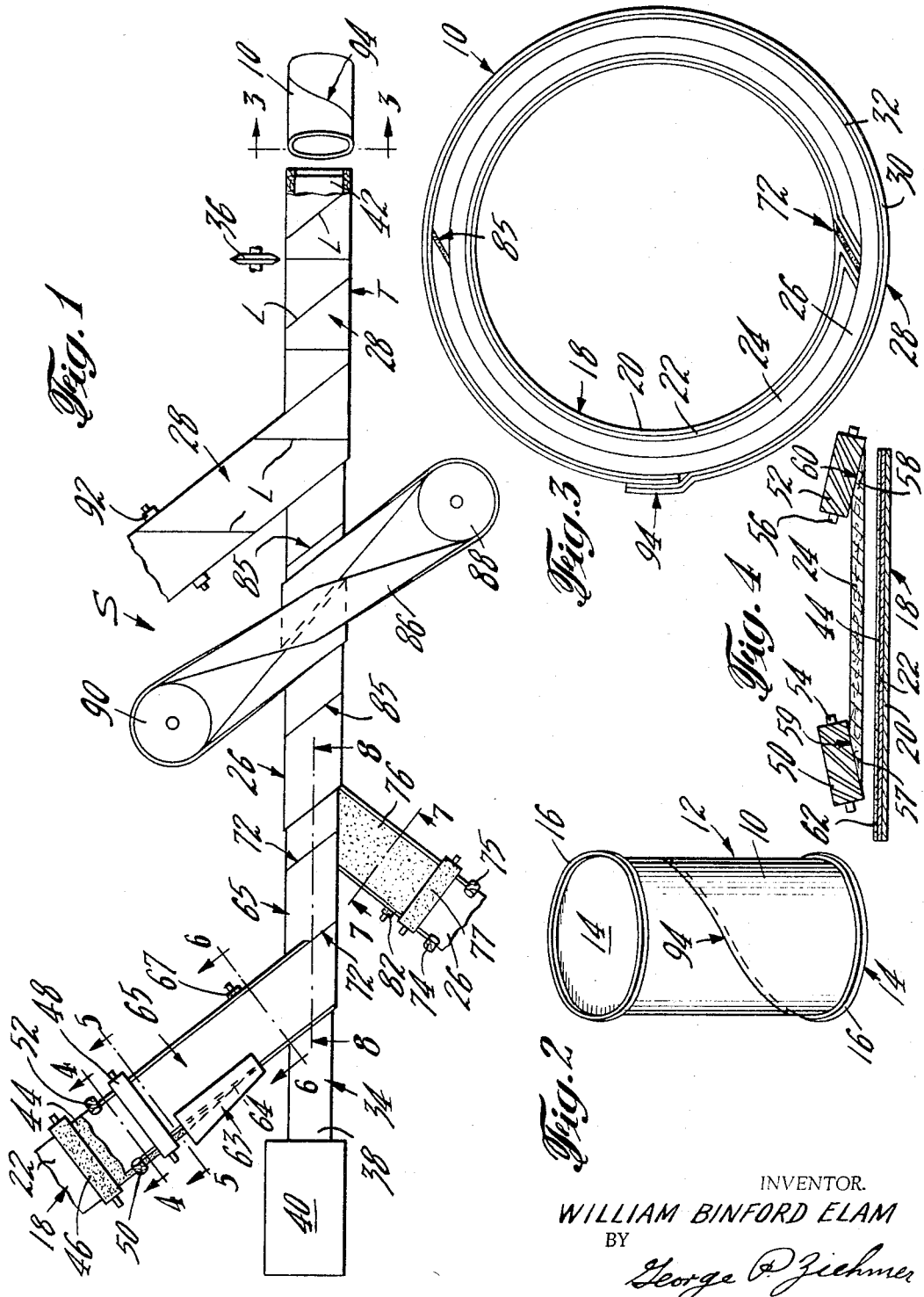
INVENTOR.
WILLIAM BINFORD ELAM
BY
George P. Ziehmer
ATTORNEY

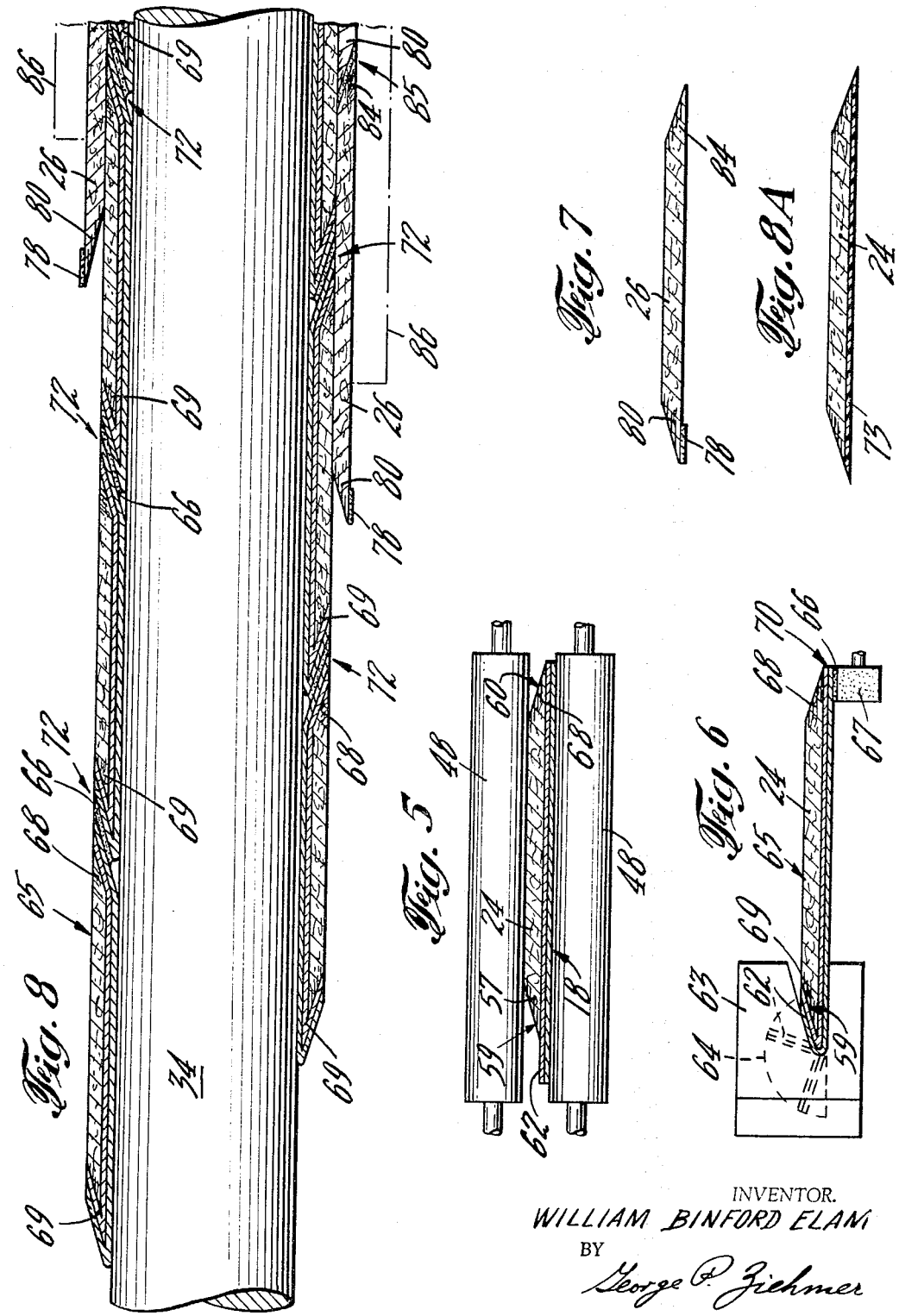

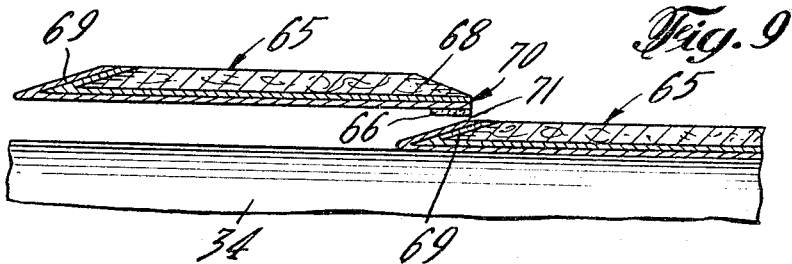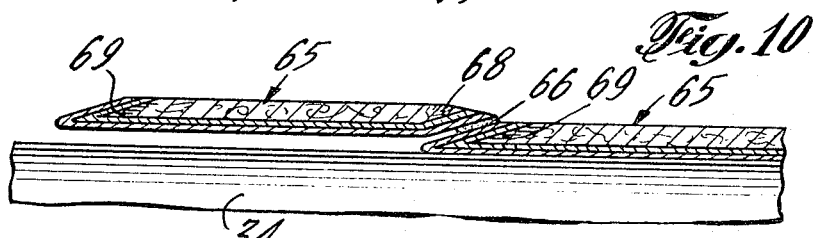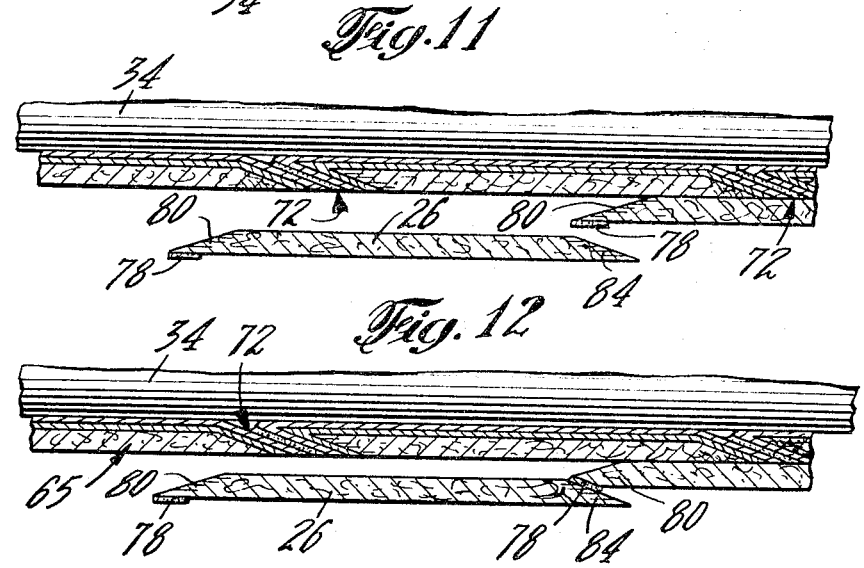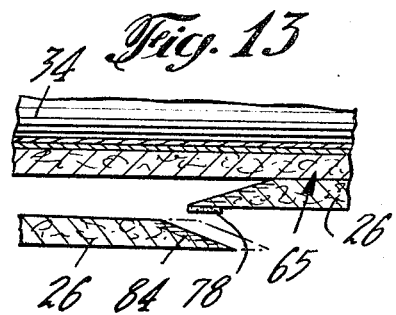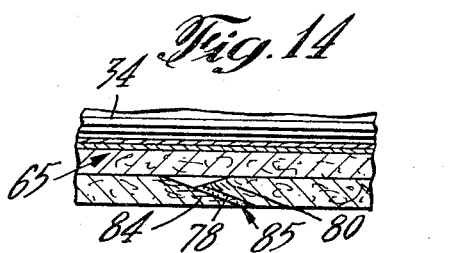

United States Patent Office 3,280,709
Patented Oct. 25, 1966

3,280,709
CONTAINER AND MANUFACTURE THEREOF
William Binford Elam, Oakland, N.J., assignor to American Can Company, New York, N.Y., a corporation of New Jersey
Filed Dec. 30, 1963, Ser. No. 334,106
4 Claims. (Cl. 93—94)

The present invention relates to spirally wound fibre container bodies, and has particular reference to the production of such bodies having helical joints of an improved type.

Recent spiral can manufacturing techniques have resulted in the production of spirally wound fibre container bodies wherein the innermost layer comprises a liquid- and moisture-proof liner and the outermost layer comprises a fully printed liquid-and moisture-proof label. Such containers are being used for an increasing variety of products, many of which contain water, oil, grease or other components which have a tendency to wick through the edges of the liner layer and into the main body plies, thus weakening the body against the various internal and external forces to which the containers are frequently subjected.

In addition, in conventional spiral can construction and manufacture wherein the edges of the various body plies are disposed at right angles to the ply surfaces, the bodies are frequently wound so that there are small spaces or gaps between the helically abutting ply edges. These gaps, which are produced because of variations in the width of the body plies, reduce the resistance of the bodies to axial and radical pressures.

The present invention contemplates a method of producing a spirally wound fibre body wherein the ply edges which form these helical body joints are bevelled in a manner which substantially eliminates the possibility of gaps between the adjacent helical ply edges. In addition, the invention provides a practical method of applying adhesive to bond these helical ply edges together.

An object of the invention, therefore is to provide a method of forming an improved type of joint between the helical edges of one or more plies or layers of a spirally wound container body.

Another object is to provide a method of forming such a joint wherein the possibility of having a gap between the helical edges of a spirally wound body layer is substantially eliminated.

Yet another object is the provision of a method of forming such a joint wherein a bonding adhesive is applied to the contacting helical edges of the body layer.

Another object is the provision of such a method wherein the adhesive is applied to a flat, unskived edge of the body ply.

Still another object is the provision of such a method which is readily adaptable to the formation of a container body having a liner ply which covers the complete interior surface of the body and extends into and forms a part of the helical joint of the adjacent main body ply.

Yet another object is the provision of a container which is formed by the instant method invention.

Numerous other objects and advantages of the invention will be apparent as it is better understood from the following description, which, taken in connection with the accompanying drawings, discloses a preferred embodiment thereof.

Referring to the drawings:

FIGURE 1 is a schematic plan view of an apparatus capable of performing the method steps of the instant method invention;

FIG. 2 is a perspective view of a composite container having a fibrous spirally wound body formed by the instant method invention;

FIG. 3 is an enlarged plan view taken along the line 3—3 of FIG. 1;

FIGS. 4, 5, 6, 7 and 8 show sectional details, on a greatly enlarged scale taken substantially along the lines 4—4, 5—5, 6—6, 7—7 and 8—8 respectively, of FIG. 1;

FIG. 8A is a section taken through a modified form of a laminated liner ply-body ply structure.

FIGS. 9 and 10 are fragmentary sectional details similar to the upper left hand portion of FIG. 8 but showing in successive stages how the leading edge of the laminated liner ply and inner main body ply structure, as it approaches the top of the mandrel, engages and is deformed by the trailing edge of the previous turn of the same laminated structure which has already been wrapped around and moved longitudinally along the mandrel.

FIGS. 11 and 12 are fragmentary sectional details, similar to the lower right hand portion of FIG. 8, and showing in successive stages how the leading edge of the outer main body ply, as it approaches the bottom of the mandrel, engages and deforms the trailing edge of the previous turn of the same ply which has already been wrapped around and moved longitudinally along the mandrel; and FIGS. 13 and 14 are fragmentary views, corresponding generally to FIGS. 11 and 12 showing how the instant method assures contact between the adjacent turns of the outer main body ply even though the leading edge of the incoming web is spaced somewhat to the rear of its ideal position.

As a preferred and exemplary embodiment of the instant invention, FIG. 1 schematically discloses the principal parts of a spiral winding machine, generally designated as S, which is capable of forming a lined and labeled fiber container body 10 which forms a component of a composite container 12, the opposite ends of the body 10 being closed by means of suitable metal end members 14 which are secured thereto in end seams 16 of any desired configuration.

As seen in FIG. 3, the body 10 preferably comprises an inner liner ply 18, which may consist of a layer of moistureproof and liquidproof aluminum foil 20 which is prelaminated to a supporting paper backing 22; an inner and an outer main body ply 24, 26, respectively, which are formed of comparatively heavy fibrous stock such as kraft or chipboard; and a label ply 28 which may consist of printed aluminum foil 30 which is prelaminated to a supporting paper backing layer 32. In the several drawings, the relative thickness of the various plys and layers are greatly exaggerated for the sake of clarity of illustration.

The body 10 is formed by winding the various plies helically around the stationary mandrel 34 of the spiral winder S to form them continuously into a tube T which is cut into individual bodies 10 by a cutting knife 36 in the usual manner. One end 38 of the mandrel 34 is fixedly mounted in a mounting block 40, the other end 42 of the mandrel 34 being free in order that the cut bodies 10 may be discharged therefrom.

The inner liner ply 18 and the inner main body ply 24 are prelaminated to each other prior to the time they are wound on the mandrel 34. This prelaminating process preferably is done while these plies are being fed toward the mandrel, although it is quite permissible to have it done at any prior time, and even in another machine.

As herein described, however, the liner ply 18 is fed toward the mandrel 34 at the proper winding angle from a suitable supply roll (not shown) carried on an unwind stand (not shown). As it approaches the mandrel 34, the upwardly facing paper backing layer 22 of the ply 18 is coated with a suitable adhesive 44 which is applied thereto by a coating roller 46 (see FIG. 1). The adhesive film 44 is shown only in FIGS. 1 and 4 and is omitted from the other figures.

Simultaneously, the inner main body ply 24 is fed towards the mandrel 34 at the same angle as and in vertical alignment above the ply 18, and is pressed against and laminated to the ply 18 by a pair of pressure rolls 48 (see FIGS. 1 and 5) between which the plies 18, 24 are fed.

Prior to being passed between the rolls 48, however, the marginal side portions of the ply 24, the side edges of which are initially squared, or normal to the top and bottom surfaces of the ply, are bevelled or skived in opposite directions by a pair of abrading or cutting knives 50, 52 which are rotated at high speeds on mounting shafts 54, 56. These knives 50, 52 operate to remove stock from both edges of the upper surface of the ply 24 to produce thereon tapering marginal edge portions 57, 58 (see FIG. 4) having bevelled surfaces 59, 60 which are inclined, preferably at equal angles, in opposite directions. The width of the bevelled surfaces relative to the width of the ply 24 is not critical. However, as an example, when the thickness of the ply 24 is .017 inch and its width is 7.5 inches, the width of each bevelled surface will desirably be in the nature of .25 inch.

The plies 18, 24 are vertically aligned so that their leading edges (to the right, as seen in FIGS. 1 and 4) are in substantial registration as they are fed towards the mandrel 34, the ply 18 being of somewhat greater width than the ply 24 so its trailing edge portion 62 extends beyond the trailing edge portion 57 of the ply 24 after these plies are laminated together, as seen in FIG. 5.

Thereafter, the laminated plies 18, 24 are passed through a plow 63 having a cam surface 64 formed therein which folds the trailing edge portion 62 of the ply 18 around the trailing edge portion 57 of the ply 24 and into contact with the bevelled surface 59 thereof, the adhesive 44 which is carried on the ply 18 creating a permanent bond between the portion 62 and the bevelled surface 59 to produce the bevelled laminated structure 65 shown in FIG. 6.

Shortly thereafter, a narrow film 66 of a suitable tacky adhesive, preferably of the hot melt type, is applied to the leading edge of the ply 18 of the laminated structure 65 by a small applying roller 67 (see FIG. 6).

As the laminated structure 65 approaches the top of the mandrel 34, its bevelled leading edge portion 68 approaches (FIG. 9) the oppositely bevelled trailing edge portion 69 of the previous turn of the structure 65 which has already been wound onto the mandrel 34. Ideally, the angle of winding and the width of the laminated structure 65 are such that its leading edge 70, as it approaches the mandrel 34, is positioned in substantial alignment with apex 71 of the obtuse angle of the trailing edge portion 69 of the previous turn of the structure 65 which is already on the mandrel 34 (see FIG. 9).

As a result, when, under the pressure of winding, the undersurface of the structure 65 is forced towards (FIG. 10) and finally brought into contact with (FIG. 8) the mandrel 34, its bevelled leading edge portion 68 is bent outwardly by the bevelled trailing edge portion 69 of its previously wound turn, with the result that the contacting edge portions of these windings assume substantially identical inclinations. In so doing, the inclination, or bevel, of the leading edge portion 68 is substantially reversed from what it originally was and the leading edge portion of the inner ply 18 is incorporated into the resultant bevelled helical joint 72. The adhesive film 66, which is carried on the now-inclined surface of the leading edge of the inner ply 18, is interposed between these inclined abutting helical edges of the helical joint 72 and forms a strong liquid-moisture-and grease-proof bond therebetween. The film of adhesive 66 is preferably made narrow enough so that it will not be squeezed inwardly into contact with the mandrel 34.

In a variation of the invention, the aluminum foil ply 18 may be substituted for by a comparable ply which may comprise a film of a thermoplastic such as polyethylene or the like which is laminated to a paper backing layer and is handled in the same manner as is the aluminum foil ply 18.

Alternatively, the liner ply may comprise a film 73 (see FIG. 8A) of a thermoplastic such as polyethylene which is extended directly onto the inner surface of the inner main body ply 24 prior to the time the marginal edge portions of the upper surface of the ply are bevelled or skived in opposite directions. In such construction, the plastic film would not be wrapped around the trailing edge of the ply 24, but it would nevertheless be interposed in the resultant bevelled helical joint when the ply 24 is helically wound in the manner heretofore described. The adhesive 66 may be utilized, or the portion of the plastic film which is incorporated in the helical joint may be softened by the application of heat or a solvent to form a fused leakproof joint. The plastic film 73 preferably extends slightly beyond both edges of the body ply 24, as seen in FIG. 8A, so that the trailing edge of the film 73 bridges the inside of the helical joint and is fused or adhesively secured to the portion of the film 73 carried on the leading edge portion of the ply 24 to prevent the penetration of the contents of the filled, finished container into the fibres of the inner body ply 24.

After the laminated structure 65 has thus been wound onto the mandrel 34, the outer main body ply 26 is wound on top of it. This ply 26 is fed from a suitable supply roll (not shown) and approaches the mandrel 34 from the side opposite to that from which the laminated structure 65 approaches it. The edges of the ply 26 are, as is the case with the ply 24, bevelled in opposite directions by a pair of rotating skiving knives 74, 75 (see FIG. 1) and its upper surface is coated with a film of adhesive 76 by an applying roller 77. Just prior to the time the ply 26 reaches the mandrel 34, a narrow film of adhesive 78 is applied to the undersurface of its trailing bevelled edge portion 80 by a small roller 82.

As the ply 26 reaches the undersurface of the mandrel 34 its bevelled marginal leading edge portion 84 engages and presses inwardly the trailing marginal edge portion 80 of its previously wound turn, thereby reversing the tapering configuration of the trailing edge portion 80 and causing it to conform to the bevelled surface of the leading edge portion 84 and form a bevelled helical joint 85 (see FIG. 8). Successive stages in the formation of this joint 85 are shown in FIGS. 11, 12 and 8. The adhesive film 78 which is interposed between the now-conforming bevelled helical abutting edges of the ply 26 forms a strong adhesive bond which considerably strengthens the joint 85.

The adhesive film 78 should be narrow enough to prevent it from being squeezed onto the outside surface of the partially formed tube, which is now passed through a winding belt 86 which is wrapped around the mandrel 34. The belt 86 is mounted on a driving drum 88 and on idle drum 90, and functions to compress the wound plies 18, 24, 26 and to rotate and advance the partially formed tube longitudinally along the mandrel 34 and to pull the various tube plies from ther supply rolls.

It will be noted that the bevelled surfaces of the ply 26 may be cut in its opposite face (the bottom face, as seen in FIG. 7), and that in such event the overlapping of the edges of the ply will produce the same result, i.e., that the inclination of one of the bevelled edge portions will be reversed by the other to produce a bevelled joint wherein the edges are disposed in helically bevelled abutting configuration. In such event, however, the adhesive 78 will be carried on the leading edge of the unbevelled upper surface of the ply 26.

It will also be realized that under some conditions, the outside surfaces of the helical bevelled joints 72, 85 of the laminated structure 65 and the ply 26 will not initially be completely smooth but may project slightly outwardly beyond the adjacent cylindrical surfaces of the wound plies, since the pressure on the overlapping edges of these plies at the point where they initially contact each other may not be sufficient to cause complete reversal of inclination of the tapered marginal edge portions. Under such circumstances, as the partially completed tube formed of these plies passes through the winding belt 86, the pressure applied by this belt will complete the edge reforming operation and produce a substantially smooth external surface on the partially formed tube.

After the smooth, partially formed tube emerges from the belt 86, the label ply 28 is fed onto it at the winding angle and wrapped around it to form the complete tube T. Prior to reaching the mandrel 34, the label ply 28 has an overall film of an adhesive (not shown) applied to it by an applying roller 92 (see FIG. 1). The label ply 28 preferably is preprinted with suitable unitary label designs (not shown), each of which is sufficient in length and shape to provide a complete label for an individual container body 10. The label ply 28 preferably is of sufficient width to provide an overlapped helical joint 94 (see FIG. 2).

After completion of the tube T, it is cut onto individual bodies 10 along lines L which are formed at the end of each unitary label design. This severing operation is preferably effected automatically by the reciprocal cutting knife 36 which moves into contact with the tube T on the line L and then moves with the tube T until the severance of the body is completed, at which time it is withdrawn from the tube and moved backwardly along the mandrel to its original position. The severed body 10 is pushed across the free end 42 of the mandrel 34 and is discharged in any suitable manner.

It will be understood that one of the main advantages of the instant invention is the fact that it makes it possible to prevent the formation of gaps or spaces between the contiguous edges of the various plies. Such gaps frequently occur in normal winding operations when plies with non-bevelled edges are utilized, and are occasioned by inherent variations in the winding operations; by the presence of camber in the ply edges due to inaccuracies in the slitting knives which cut the plies from wider webs, and by variations in the width of the various plies. In the instant invention, however, the edges of the laminated structure 65 and the body ply 26, being overlapped and reversely bevelled, compensate for such variations, provided they do not exceed the overlap width.

This effect can be seen in the example shown in FIGS. 13 and 14 wherein the ply 26 is shown as being fed onto the mandrel in a position which is rearwardly offset substantially to the rear of its ideal position, which is shown in dot and dash lines. As seen, even under these circumstances, contact is made between the adjacent front and rear bevelled edge portions 84, 80 of successive turns of the ply because of their oppositely bevelled surfaces, and a bonded joint 85 is still produced. In normal winding operations, a gap equal to the offset distance would be produced between the leading and trailing edges of the ply under similar conditions.

It is thought that the invention and many of its attendant advantages will be understood from the foregoing description and it will be apparent that various changes may be made in the form, construction, and arrangement of the parts without departing from the spirit and scope of the invention or sacrificing all of its material advantages, the form hereinbefore described being merely a preferred embodiment thereof.

I claim:
1. A method of container manufacture, comprising providing a body ply, bevelling the opposed longitudinal marginal edge portions of one face of said body ply to provide marginal edge portions having bevelled surfaces on one side which incline in opposite directions and having unbevelled surfaces on the reverse side, laminating to the unbevelled opposite face of said body ply a liner ply of greater width than said body ply with one edge of said liner ply aligned with one edge of said body ply and with the opposite marginal edge portion of said liner ply projecting outwardly beyond the other, adjacent edge of said body ply, folding the projecting marginal edge portion of said liner ply around the said adjacent edge of said body ply and into engagement with the adjacent inclined bevelled surface of said body ply, applying an adhesive to the unfolded edge portion of said liner ply, helically winding the resultant laminated structure to bring its opposite marginal edge portions into overlapping relationship, and bringing the adhesively coated unfolded marginal edge portion of said liner ply into pressured engagement with the folded marginal edge portion of said liner ply to thereby force the unfolded marginal edge portion of said liner ply to conform to the inclination of the folded marginal edge portion of said liner ply and to reshape the underlying marginal edge portion of said body ply to cause its initially inclined surface to lose its bevel and to cause its initially unbevelled surface to become bevelled, whereby a smooth adhesively joined, leakproof helical lap joint is produced with both of said liner ply marginal edge portions extending into said joint.

2. The method of claim 1, wherein a film of adhesive is applied to one surface of said liner ply prior to the time it is laminated to said body ply, said film covering that surface of the projecting marginal edge portion of said liner ply which is folded into engagement with the adjacent, inclined, bevelled surface of the body ply to secure said folded liner ply portion to said body ply.

3. The method of claim 2, wherein a second body ply is helically wound around the outside surface of said helically wound body and liner ply.

4. The method of claim 3, wherein said second body ply is also provided with marginal edge portions having oppositely inclined bevelled surfaces formed in one side thereof, and wherein the oppositely bevelled marginal edge portions of said second body ply are forced into pressured overlapping relationship to cause at least one of said marginal edge portions to reshape itself to conform to and complement the bevelled surface of the other of said marginal edge portions.

References Cited by the Examiner
UNITED STATES PATENTS

| | | | |
|---|---|---|---|
| 1,940,145 | 12/1933 | Raiche | 156—190 |
| 2,785,700 | 3/1957 | Yovanovich | 156—195 X |
| 2,969,902 | 1/1961 | Cage | 229—4.5 |
| 3,002,433 | 10/1961 | Dunlap | 93—94 |
| 3,014,630 | 12/1961 | Whelan et al. | 229—4.5 |
| 3,038,832 | 6/1962 | Carlson et al. | 156—190 |
| 3,093,287 | 6/1963 | Stark | 229—4.5 X |
| 3,156,401 | 11/1964 | Krause | |
| 3,162,347 | 12/1964 | Taylor. | |

BERNARD STICKNEY, *Primary Examiner.*

JOSEPH R. LECLAIR, J. F. McNULTY,
*Assistant Examiners.*